March 15, 1966     H. SCHAEVITZ     3,240,281

SCALE

Filed June 1, 1965

INVENTOR
HERMAN SCHAEVITZ

BY *Edward M Farrell*

ATTORNEY

United States Patent Office 3,240,281
Patented Mar. 15, 1966

3,240,281
SCALE
Herman Schaevitz, Haddon Township, N.J., assignor to Schaevitz Engineering, a corporation of New Jersey
Filed June 1, 1965, Ser. No. 460,407
10 Claims. (Cl. 177—210)

This invention relates to scales, and more particularly, to a mechanical or electro-mechanical scale for accurately determining the weight of an object.

Scales for weighing objects have taken numerous different forms involving the use of both mechanical and electrical means. In the main, such scales have included devices for detecting an unbalance between a standard weight and the weight of the object being measured.

Many of the more popular scales involve the use of various spring elements adapted to be expanded in accordance with the weight of the object being weighed, with suitable visual indicating means being provided to indicate a degree of unbalance. Such scales generally involve a relatively large number of parts, with the accuracy of such scales becoming impaired over a period of time because of the changes in the physical characteristics of the parts as a result of use.

Aside from the many parts and inaccuracy of the many scales used heretofore, the cost of the labor for assembly and final adjustments have been relatively high.

It is an object of this invention to provide an improved weighing scale.

It is a further object of this invention to provide an improved weighing scale of high accuracy.

It is still a further object of this invention to provide an improved weighing scale of high mechanical strength and ruggedness.

It is still a further object of this invention to provide an improved weighing scale of high accuracy which may be manufactured relatively easily and economically.

In accordance with the present invention, a scale is provided having a main movable member connected to a main stationary member through relatively thin but wide flexure elements. The main movable member may include relatively heavy horizontal bar elements connected to relatively heavy vertical elements through additional flexure elements. The scale including the main member and the flexure elements may be made as a single piece. An object to be weighed may be placed upon the main movable member to cause an unbalance in the scale which is representative of the weight of the object. The degree of balance and weight may be determined by suitable transducer means associated with the main members.

Figure 1:
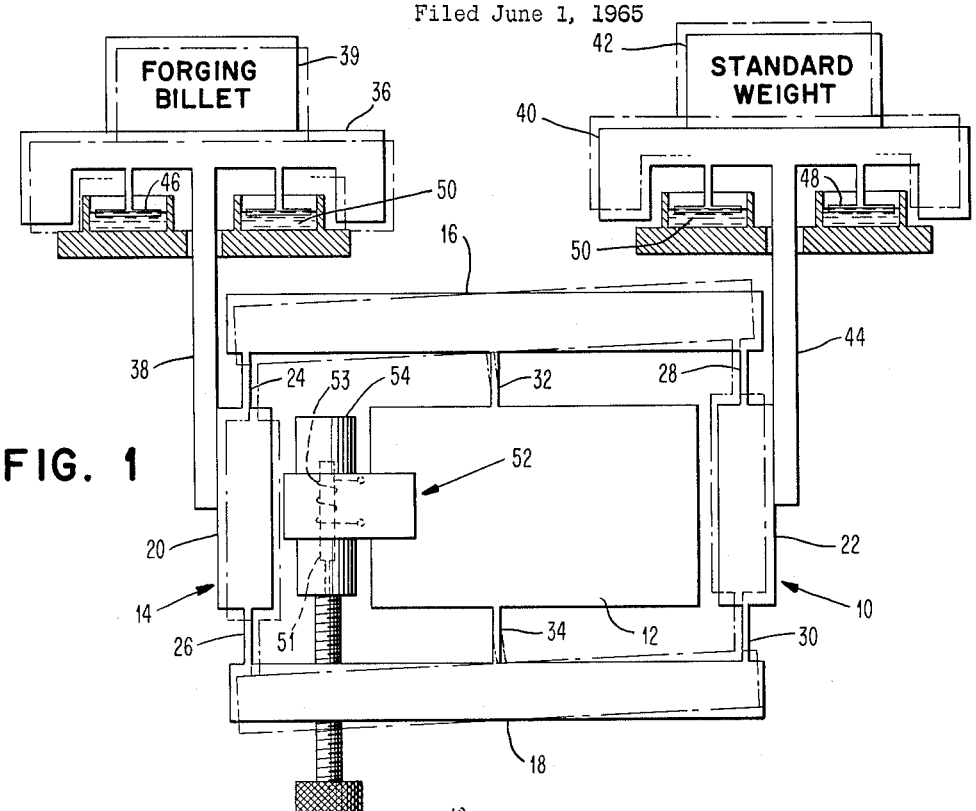
Figure 2:
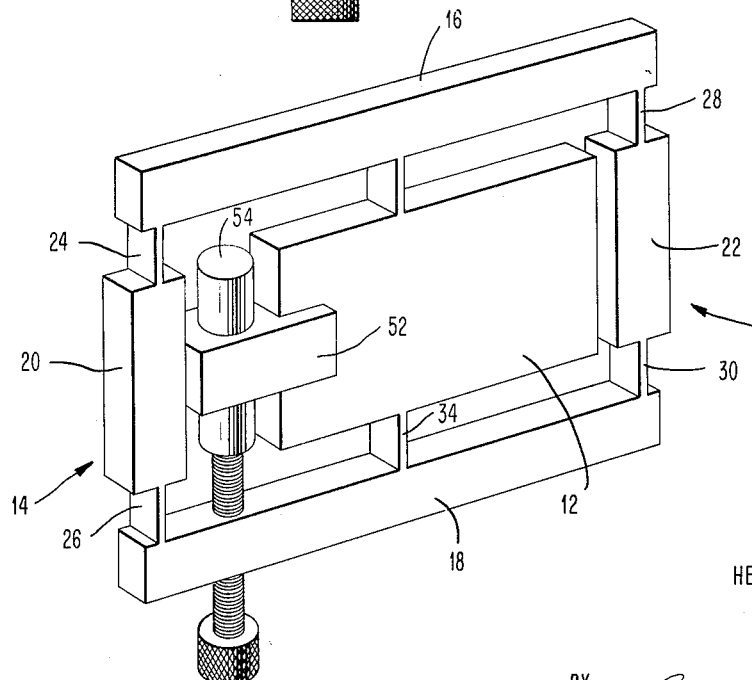

Other objects and advantages of the present invention will be apparent and suggest themselves to those skilled in the art, from a reading of the following specification and claims in conjunction with the accompanying drawing, in which:

FIGURE 1 is a front view of a scale, in accordance with the present invention, and FIGURE 2 is a perspective view of the main portions of the scale illustrated in FIGURE 1.

Referring particularly to FIGURE 1, a weighing scale 10 comprises a rigidly mounted member 12 and a movable member 14. The movable member 14 includes a pair of solid horizontal bars or elements 16 and 18 and a pair of vertical bars or elements 20 and 22. The vertical element 20 is connected to the top and bottom horizontal elements 16 and 18 through flexure elements 24 and 26, respectively. Likewise the vertical element 22 is connected to the top and bottom horizontal elements 16 and 18 through flexure elements 28 and 30, respectively.

The movable or outer member 14 may be considered as a parallelogram adapted to be moved about the rigidly mounted member 12. The outer member 14 is physically connected to the mounted member 12 through flexure elements 32 and 34.

The basic function of the scale illustrated is to provide a method of comparing the weight of an object with a standard weight. A differential weighing balance is used to indicate the weight of the object.

A first platform 36, supporting the object 39 to be weighed, is attached to the vertical element 20 through an arm 38. A second platform 40, supporting an object 42 of standard weight, is attached to the vertical element 22 through an arm 44. Each of the platforms 36 and 40 include annular rings 46 and 48, respectively, adapted to be moved vertically within annular troughs which are filled with viscous damping fluid 50. The weighing platforms and the structure containing the annular troughs are rested so as to provide protection against the entry of atmospheric dust particles.

A transducer 52, schematically represented in dotted lines by a movable core 51 adapted to be moved with respect to a fixed coil 53, may be a differential transformer. The core 51 which may be attached to the rigidly fixed element 12 with the coil 53 being fixed to the movable member 14. Relative movement between the two members 12 and 14 will cause the core 51 to be moved with respect to the coil 53 to cause a variable output signal from the differential transformer 52.

The use of differential transformers, having an output signal varying in accordance with the movement of an object, is well known to those skilled in the art. Its operation will therefore not be described in detail. It should be emphasized, however, that various types of other transducers may be used with the scale of the present invention.

In operation, if the weights of the objects on the two platforms which are connected to the vertical elements, are different, a deflection will take place which is balanced by the tension in the flexure elements. For example, if the weight of the object 39 is greater than the standard weight 42, the vertical element 20 will be deflected downward and the vertical element 22 will move upward.

The dotted lines of FIGURE 1 illustrate the positions of the various elements after deflection. Actually the degree of deflection has been exaggerated in order to illustrate the operation. In actual practice, it may be desirable to limit the degree of deflection or rotation to a relatively small angle so that the percentage change in moment arm will be negligible.

It is noted that when the scale is unbalanced and the various elements are deflected that the horizontal and vertical elements form a parallelogram, which is supported to the main stationary element 12 through flexure elements 32 and 34. When the scale is unbalanced, the vertical elements 20 and 22 remain parallel with respect to each other. Likewise, the horizontal elements 16 and 18 remain parallel with respect to each other.

When the weight 39 is heavier than the weight 42, the movable member 14, comprising the parallelogram, may be said to rotate about the fixed member 12 in a counter clockwise direction. If the standard weight 42 is greater, the parallelogram will move in a clockwise direction.

When the vertical element 20 is moved downward, the flexure elements 24 and 26 are bent slightly so that the vertical element 20 remains substantially vertical despite deflection of the scale. Likewise, as the vertical element 22 is moved upwardly, the flexure elements 28 and 30 are bent slightly so as to maintain the vertical element 22 in a vertical position during operation.

The flexure elements 32 and 34 are also bent slightly as the main movable member 14 is rotated during operation. In the condition of operation illustrated, the top end of the flexure element 32 will be moved to the left and the bottom end of the flexure element 34 will be moved to the right.

As more clearly illustrated in FIGURE 2, the vertical members 20, 22 and the horizontal members 16, 18 are constructed of relatively heavy bars with relatively deep dimensions. The flexure elements 24, 26 and 28 and 30 are long and slender and relatively thick. In the embodiment illustrated, the thickness or depth of the flexure elements is substantially the same as the depth of the main vertical and horizontal elements.

Because of the relatively large thicknesses of the various elements involved, any weight on the platforms will tend to move the vertical elements 20 and 22 straight up and down in a single plane, disregarding, of course, the slight movements to the right or left due to the moment arm. Movements of the vertical elements 20 and 22 in directions normal to the vertical direction of movement is avoided by the relatively deep thicknesses of the flexure elements. Consequently, it is seen that the various objects to be weighed may be placed on the platforms at various different positions without affecting the accuracy of the measurement.

The precise dimensions of the flexure elements may be chosen to provide compression and bending which will provide a relatively linear movement of the outer member 14 so as to provide a relatively linear electrical output signal from the transducer 52.

As is more clearly illustrated in FIGURE 2, the main portions of the scale 10, i.e., parts 12, 14, 16, 18, 20, 22, 24, 26, 28, 30, 32 and 34 may be considered as a unitary member. Thus the scale avoids the need of complicated spring mechanisms which add to the manufacturing cost of both parts and assembly.

In manufacturing the main portions of the scale 10 from a unitary member, such a member may comprise a heat treated low alloy steel or other suitable material. The various cut-out of selected portions from the unitary member may be achieved by milling, rough sawing or other suitable means.

The scale illustrated is relatively rugged in construction and is relatively insusceptible to inaccuracy resulting from use.

Of course the scale illustrated may be modified in a variety of different ways without departing from the scope of the present invention. In some applications, it may be desirable that the flexure elements 24, 26, 28, 30, 32, and 34 be of somewhat different forms than the single straight elements illustrated.

For example, if it is necessary to further minimize or eliminate any variations in balance points with different positions of weights on the platforms 36 and 40, a pair of flexure elements crossing each other at right angles may be used in place of the single flexure elements shown. The pair of flexure elements may be arranged in the form of an "X" and disposed at forty-five degree angles with respect to the main portions of the scale which are interconnected by the flexure elements.

In some cases, the scale illustrated may comprise separate main bodies connected to each other with the flexure elements of one of the main bodies being disposed at right angles to the flexure elements of the other main body. The precise arrangement used will depend largely upon the applications to which the scale is put, the amount of buckling which may be tolerated as other design considerations well known to those skilled in the art.

With other embodiments of the present invention methods of manufacturing other than sawing and drilling may be used. It is apparent that any suitable method of manufacturing may be involved in building scales in accordance with the present invention.

What is claimed is:

1. A scale comprising a pair of parallel horizontal bar members and a pair of vertical parallel members, flexible elements dimensioned to be flexed in a single plane connecting said horizontal and vertical members, a fixed element, additional flexible elements dimensioned to be flexed in a single plane connecting said horizontal members to said fixed element, said flexible elements permitting said horizontal and vertical members to maintain their parallel relationship when said scale is operated.

2. A scale comprising a pair of parallel horizontal bar members and a pair of vertical parallel bar members, flexible elements dimensioned to be flexed in a single plane connecting said horizontal and vertical members, a fixed element, additional flexible elements dimensioned to be flexed in a single plane connecting the central portions of said horizontal members to said fixed element, the direction of flexure of all of said flexible elements permitting said horizontal and vertical members to maintain their parallel relationship when said scale is unbalanced, and means for detecting the degree of vertical movement of said vertical bar members when said scale is unbalanced.

3. A scale comprising a pair of parallel solid horizontal members and a pair of vertical parallel solid members, the relative thicknesses of said horizontal and vertical members being substantially the same, first flexible elements having substantially the same thickness as said horizontal and vertical elements and being relatively thin to permit bending in a single plane, said flexible elements connecting said horizontal and vertical members, a fixed element, additional flexible elements connecting the central portions of said horizontal members to said fixed element, said additional flexible elements being of substantially the same thickness as said horizontal and vertical members and being relatively thin to permit bending in a single plane in the same plane as said first flexible members, said flexible elements bending when said scale is unbalanced in a direction to maintain said horizontal and vertical members in their parallel relationship.

4. A scale as set forth in claim 3 wherein said scale comprises a single solid block of material with areas cut out to form said horizontal members, said vertical elements and said flexible elements.

5. A scale comprising a pair of parallel solid elongated horizontal members and a pair of elongated vertical parallel solid members, the relative thicknesses of said horizontal and vertical members being substantially the same, first flexible elements having substantially the same thickness as said horizontal and vertical elements and being relatively thin to permit bending in a single plane, said flexible elements connecting said portions of said horizontal to end portions of said vertical members, a pair of platforms adapted to receive weights secured to the sides of said vertical elements, a fixed element, additional flexible elements connecting the central portions of said horizontal members to said fixed element, said additional flexible elements being of substantially the same thickness as said horizontal and vertical members and being relatively thin to permit bending in a single plane in the same plane as said first flexible members, said flexible elements bending when said scale is unbalanced in a direction to maintain said horizontal and vertical members to maintain their parallel relationship, said vertical elements being moved in a substantially vertical direction when said scale is unbalanced by different weights on said platforms, and transducer means for detecting the degree of movement of said vertical elements.

6. A weighing scale comprising a differential balance having a pair of platforms, one of said platforms being adapted to support a standard weight and the other of said platforms being adapted to support an object to be weighed, a fixed member, a pair of parallel solid horizontal members, one of said horizontal members being disposed above said fixed member and the other being disposed below said fixed member, a pair of parallel solid vertical members disposed on either side of said fixed member, means for connecting said pair of platforms to said pair of vertical members, first flexure elements dimensioned to be flexed in a single plane connecting said horizontal members to said vertical members to form a parallelogram, additional flexure elements dimensioned to be flexed in the same plane as said first flexure elements connecting said horizontal members to said fixed member, said flexure elements being dimensioned to permit said horizontal and vertical members to maintain their parallel relationship when unbalanced weights are placed on said pair of platforms to cause substantially vertical movements of said vertical members.

7. A force-measuring scale having a major and a minor axis both lying in a given plane and intersecting each other at a given angle, said scale being adapted to measure the magnitude of an externally applied force acting in said plane, the direction of said force being parallel to said major axis comprising, in combination, a substantially rigid base for supporting said scale,
a substantially rigid force-receiving member adapted to receive said force,
a substantially rigid rectangular force-transmitting bar member having an axis lying in said plane parallel to and spaced apart from said major axis,
said force-receiving member being operatively connected to said force-transmitting member to support said force therefrom,
two spaced apart substantially rectangular rigid force-supporting bar members each having an axis lying in said plane in parallel relationship to said minor axis,
flexible elastic hinge means connecting said force-transmitting member to each of said force-supporting members at the intersections of their respective friction forces,
axes, to allow the members to rotate in said plane relative to each other about said intersections substantially elastically and free of friction forces,
additional flexible elastic hinge means connecting said force-supporting members to said base at the intersections of their respective axes with said major axis to allow the members to rotate in said plane relative to said support about their respective axis intersections substantially elastically and free of all of said hinge means being adapted to transmit direct forces in the directions of said major and minor axes which provide substantially elastic and friction-free pivot action for said members,
said hinge means also providing elastic restoring force action resisting the action of said force upon the scale, said restoring force action being proportional to the magnitude of said force,
so that upon application of said force the force-transmitting member moves in the direction of and parallel to said major axis and said force-supporting members rotate in said plane about their respective hinges while remaining parallel to each other,
whereby the motion of said scale members in response to said force is substantially proportional to the magnitude of said force and independent of any force component that may be acting on the force-receiving member in the direction of said minor axis, and whereby said motion is also substantially independent of the distance between said externally-applied force and said major axis, and measuring means responsive to said motion to provide a measure of the magnitude of said externally applied force.

8. The invention as set forth in claim 7 wherein said scale comprises a single flat plate to provide a friction-free scale without mechanically assembled interconnections between the moving members.

9. The invention as set forth in claim 8 wherein damping means are included to resist the velocity of the moving parts of said scale relative to said base without introducing solid friction.

10. The invention as set forth in claim 9 wherein said means responsive to said motion comprises a motion-responsive electrical transducer which does not substantially affect the sensitivity to said force.

References Cited by the Examiner

UNITED STATES PATENTS

| 2,939,694 | 6/1960 | Bradley | 177—210 |
| 2,997,875 | 8/1961 | Moore | 73—141 |
| 3,077,940 | 2/1963 | Blodgett et al. | 177—211 X |
| 3,080,936 | 3/1963 | Sher et al | 177—210 |
| 3,133,606 | 5/1964 | Thomson | 177—210 |
| 3,186,220 | 6/1965 | Flinth | 73—141 |

FOREIGN PATENTS 875,471  8/1961  Great Britain.

LEO SMILOW, *Primary Examiner.*